United States Patent
Gao

(10) Patent No.: US 12,462,299 B2
(45) Date of Patent: Nov. 4, 2025

(54) MULTI-LAYER ARTIFICIAL INTELLIGENCE MODELS FOR PROGRESSIVE PREDICTIONS DURING DATA PIPELINE MANAGEMENT

(71) Applicant: PayPal, Inc., San Jose, CA (US)

(72) Inventor: Haipeng Gao, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 18/607,394

(22) Filed: Mar. 15, 2024

(65) Prior Publication Data

US 2024/0303730 A1    Sep. 12, 2024

Related U.S. Application Data

(63) Continuation of application No. 17/537,267, filed on Nov. 29, 2021, now Pat. No. 11,961,137.

(51) Int. Cl.
    *G06Q 40/03*    (2023.01)
    *G06N 5/04*     (2023.01)
    *G06N 20/00*    (2019.01)

(52) U.S. Cl.
    CPC ............ *G06Q 40/03* (2023.01); *G06N 5/04* (2013.01); *G06N 20/00* (2019.01)

(58) Field of Classification Search
    CPC ........... G06Q 40/03; G06N 20/00; G06N 5/04
    See application file for complete search history.

(56) References Cited

U.S. PATENT DOCUMENTS

| | | | |
|---|---|---|---|
| 10,907,983 B1* | 2/2021 | Singh | G08G 1/096816 |
| 10,949,831 B1* | 3/2021 | Gaudin | G06Q 20/367 |
| 11,295,080 B2 | 4/2022 | Allen et al. | |
| 2019/0304595 A1 | 10/2019 | Bergman et al. | |
| 2021/0233143 A1 | 7/2021 | Cho et al. | |
| 2021/0240517 A1 | 8/2021 | Mohapatra et al. | |
| 2021/0248500 A1* | 8/2021 | Amur Varadarajan | G06N 5/04 |
| 2021/0312276 A1 | 10/2021 | Rawat et al. | |
| 2021/0391063 A1* | 12/2021 | Adhikari | A61B 5/7267 |
| 2022/0036261 A1* | 2/2022 | Achar | G08G 1/0129 |

\* cited by examiner

*Primary Examiner* — Scott C Anderson
(74) *Attorney, Agent, or Firm* — Haynes and Boone, LLP

(57) ABSTRACT

There are provided systems and methods for multi-layer artificial intelligence models for progressive predictions during data pipeline management. A service provider may provide AI functionalities, such as through a multi-layer ML model framework that employs multiple layers for different ML models that process different features. The features in one layer and ML model may process data for static features, where an output from this layer may be used as an input with data for dynamic feature that provide a predictive score or output for the input data. The static features may only be required to be processed once or a few times in the first layer and may not be required to be further processed again at later times. With the second layer, the data for the dynamic features may change, and thus the second layer may process new data without being required to reprocess the static features.

20 Claims, 6 Drawing Sheets

MULTI-LAYER ARTIFICIAL INTELLIGENCE MODELS FOR PROGRESSIVE PREDICTIONS DURING DATA PIPELINE MANAGEMENT

CROSS REFERENCE TO RELATED APPLICATION

The present invention is a Continuation of U.S. patent application Ser. No. 17/537,267, filed Nov. 29, 2021 which is incorporated herein by reference in its entirety.

TECHNICAL FIELD

The present application generally relates to artificial intelligence (AI) models trained for pipeline decision-making over a period of time and more particularly to a multi-layer AI framework for determining predictive outputs based on static and dynamic data aggregated over one or more time periods.

BACKGROUND

Service providers may provide artificial intelligence (AI) systems and AI models trained for a particular user over time based on training data provided to the AI system. Generally, AI systems may include machine learning (ML) and neural network (NN) models that may be used for predictive outputs, scoring, and/or decision-making. For example, a particular AI platform may be associated with providing predictive outputs for pipeline decision-making where a decision is determined and updated over a period of time. This may be daily, weekly, or monthly decision-making that is updated based on changes to data. Some pipeline decision-making systems may include scoring loan viability and/or likelihood of acceptance for a user, default likelihood and/or likelihood of default repayment, and the like, which may change based on initial data and changes to that data over a time period. However, other AI systems may also use pipeline decision-making during marketing and advertisements, recommendations, natural language processing, automating chat assistance and responses, processing search queries through search engines, performing text and/or image processing and recognition, automating device and/or vehicle operations, and the like. Typical conventional AI systems and operations make static decisions and scores that correspond to data available at a certain point in time. These systems are incapable of generating dynamic decisions and scores for dynamically changing data. Further, when the AI systems generate further decisions and scores, those systems ingest and process static features that do not change, which causes unnecessary computing resource usage and data processing power to make such decisions.

Figure 1:
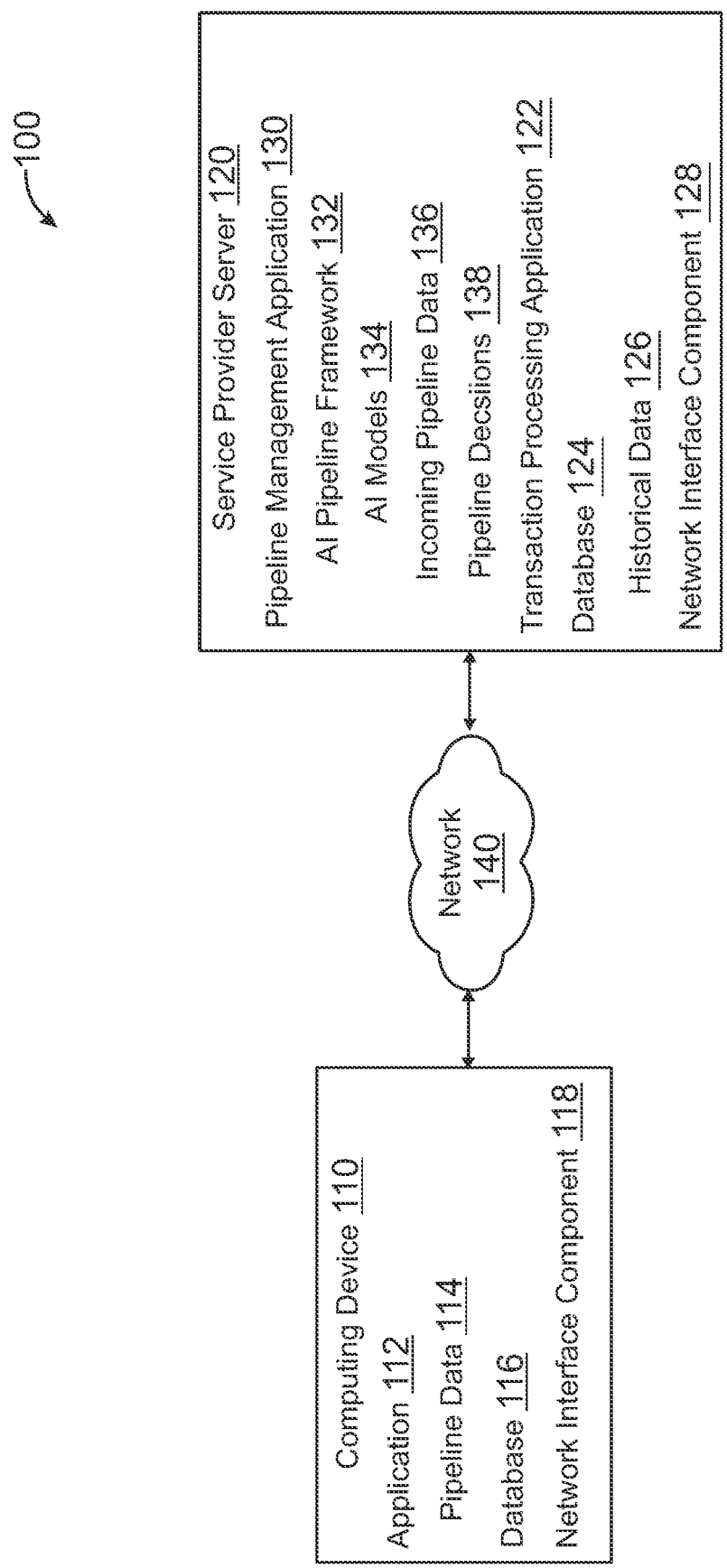
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for multi-layer artificial intelligence models for progressive predictions during data pipeline management. Systems suitable for practicing methods of the present disclosure are also provided.

A service provider may provide progressive decision-making pipelines in order to provide different services to customers, merchants, businesses, and other users (e.g., more generally, entities) of the service provider. Decision-making pipelines may be used to provide changing, adjustable, or variable decisions, predictions, scores, or the like for these entities when offering, providing, or maintaining a service of the service provider that is utilized by those entities. For example, when determining whether an entity qualifies for a loan, should be offered terms on a loan, and/or whether the entity may be delinquent on an offered or provided loan, the service provider may calculate different scores that affect their decision-making operations using an AI decision-making pipeline. In order to provide more accurate decision-making and services to these entities, the service provider may utilize a multi-layer ML or other AI model framework that may make decisions on different static and dynamic data over a period of time. For example, the framework may ingest and/or process data from data at a first point in time in order to determine features or variables and may make a decision using at least two ML or other AI models that each process one or more dynamic and/or static features. At a later point in time, new data may be received that adjusts the input features or variables for the two or more ML models. Thereafter, one or more of the ML models that processes the changed features may update the decision, prediction, or score provided as output at the later point in time.

A service provider, which may provide services to users including electronic transaction processing such as online transaction processors (e.g., PayPal®), may allow merchants, users, and other entities to establish an account to utilize computing services provided by the service provider, including electronic transaction processing. A user may interact with the service provider to establish an account and provide other information for the user (e.g., consumer, merchant, service provider, or other entity). In order to utilize the computing services of a service provider, the account with the service provider may be established by providing account details, such as a login, password (or other authentication credential, such as a biometric fingerprint, retinal scan, etc.), identification information to establish the account (e.g., personal information for a user, business or merchant information for an entity, or other types of identification information including a name, address, and/or other information), and/or financial information. The service provider may also provide other computing services, including electronic transaction processing, social networking, microblogging, media sharing, messaging, business and consumer platforms, etc. Thereafter, the user may link their account with any online data sources and/or AI platforms that provide AI functionalities to the user so that the service provider may monitor the user's interactions with those AI platforms and provide AI modeling and predictive services when utilizing AI platforms.

For example, a progressive decision-making pipeline may utilize one or more ML or other AI models (e.g., rule-based and/or NN models and engines) to determine decisions, scores, and/or other outputs that are used to predict an entities behavior and/or otherwise provide a service based on a prediction for the entity. When determining decisions, the ML models may process data for different features or variables. For example, an ML model may utilize an algorithm that intakes data for different features and processes the data to determine different values or scores that provide one or more decisions or predictions. Features may be considered "static" and "dynamic" over a time period. For example, as the decision-making pipeline makes decisions over a time period (e.g., hourly, daily, weekly, monthly, etc.), data may correspondingly be predicted or estimated to change and therefore the corresponding output decision, prediction, score, or other output may change. A static feature may correspond to a feature or variable for which data does not change and/or is not recalculated or adjusted during or over the time period, such as when data remains unchanged or changed but not to the extent that needs recalculation or adjustment. This can be based on the type of data and data attributes. For example, for an account balance that is $100,000, a change of that data to $999,500 may still be considered static. Thus, different thresholds can be used for different types of data to determine whether a change in that data over the time period makes the data static or dynamic. In contrast, a dynamic feature may be considered as having data that changes during the time period (above some threshold, which again can be based on data attributes) and for which data needs to be changed and reprocessed by one or more ML models during the time period to adjust the corresponding predictive output. Further, additional layers or levels of dynamic features may also be identified, such as "super dynamic" features that may change faster (e.g., hourly instead of daily or weekly) and the like. For example, the static features may include personal information, financial information, business entity information, long-term asset information, or long-term debt information, whereas the dynamic features may include an account balance, short-term asset information, short-term debt information, an amount of time over the time period, or an activity by the entity during the time period.

In this regard, the service provider may train multiple ML or other AI models of a multi-layer AI model framework and/or system for decision-making and predictive outputs for a corresponding progressive decision-making pipeline. The framework may correspond to a two or more-layer ML model framework, which may utilize the multiple ML models to provide different predictive outputs at different points in time. For example, a first ML model may be trained for static features and/or variables and may provide an output based on data for the static features. A second, dynamic, ML model may ingest and/or process the static output from the first ML model (e.g., the static ML model) with dynamic features that have changing data over a time period. The second ML model may therefore be used to provide predictive outputs at different points in time over the time period based on changing data. By using the static predictive output from the static ML model as an input, less features may be required to be processed by the second dynamic ML model, which requires less processing resources to be expended and/or faster resulting decision-making by having lighter and more efficient ML models for the multi-layer ML model framework. Although two ML models are discussed above, more ML model layers may also be used, such as to deal with "super dynamic" features and the like.

In some embodiments, where the ML, NN, or other AI algorithms and operations for a particular platform are known to the service provider, the algorithms may be used to train the multi-layer ML model framework using the training data, classifiers, recommendations, and/or other inputs/outputs. In such embodiments, the service provider may also use weights and attributes from the input training data to generate classifiers and recommendations for the framework. However, the service provider may utilize other known or proprietary AI algorithms (e.g., supervised or unsupervised machine learning algorithms, neural network algorithms, and the like) to determine weights, attributes, classifiers, and/or output recommendations and predictions to train the ML models of the framework. Further, the service provider may continue building the model based on additional training data (e.g., the inputs and outputs, as well as the classifiers and/or recommendations), as well as retroactively fitting the ML model(s) based on the framework's past inputs/outputs. Thus, the service provider may combine multiple different ML models for the framework, for example. The service provider may also provide connections, data calls, and instructions between different processing stacks and/or computing systems of the service provider for exchange of data used for training and/or decision-making by the decision-making pipeline.

The static features for first ML model and the dynamic features for the second ML model may not overlap, and therefore each may correspond to a subset of the overall features used to provide a resulting predictive output for an entity that changes over the time period. The static features and the dynamic features may correspond to different amounts, numbers, shares, or percentages of the overall features and therefore the static predictive output provided as a processed feature input to the second ML model with data for dynamic features may have a corresponding weight that affects the output prediction, decision, or score. For example, where the static features may outnumber (e.g., 800 features) the dynamic features (e.g., 200 features), a corresponding weight may be applied to the static predictive output and the dynamic features when processed by the second ML model and thus may constitute a higher effect on the predictive output by the second ML model. Different weights may be applied based on configuration of the ML models and framework by a data scientist, administrator, or the like. However, in other embodiments, some features may overlap and other weighting and/or balancing may be provided. Feature data for each feature may be extracted from data for the entity and/or the service being provided to the entity in order to be processed by each ML model.

Thus, data may be received at an initial point in time for an entity when providing some service that requires a predictive output by the multi-layer ML model framework. The first ML model layer that processes feature data for the static features may then process extracted feature data, and may then provide a first predictive output, such as a prediction, decision, or score that is based on the static features. This may be a partial decision or score for the actual decision or prediction to be made for the entity (e.g., in the process of providing a computing service or feature). Thereafter, this partial output from the first static feature ML model layer may then be input to the second dynamic feature ML model layer (e.g., as an input feature for an input layer) with extracted dynamic feature data for the second ML model layer. The second ML model layer may then provide an overall predictive output for the computing service provided to the entity, which may then be used by the progressive decision-making pipeline to provide that computing service to the entity at a specific point in time, such as an initial time for a time period. For example, with loan delinquencies, loan success or acceptance likelihood, or the like for an electronic transaction processor, the predictive output may be used to determine if an entity is likely to repay a loan, be delinquent on a loan, and/or accept a loan (and therefore should be reached out to for loan acceptance).

Thereafter, additional data may be received at a different point in time during a time period of decision-making by the progressive decision-making pipeline. The additional data may then be processed so that additional data for the dynamic features of the second ML model and layer may be extracted and determined. This data may then be used as input for an input layer for the second ML model with the previously determined output from the first ML model processing the static features. Thus, less features are required to be processed and the first ML model may not be required to be executed and provide a decision. This allows for lighter and less data processing intensive operations to be executed to update the previous predictive output based on data that changes for the dynamic features during the time period. By applying different weights to the dynamic features and the static predictive output with the second ML model and layer, the predictive output may be updated and changed in order to reflect changes to data over the time period.

Thereafter, the initial predictive output, decision, or score may be adjusted, recalculated, revised, and/or changed based on the new predictive output from the second ML model and additional data. This may include replacing or updating the output with the progressive decision-making pipeline, which allows for dynamic outputs and more current and accurate predictions to be made based on changing data. By utilizing multiple layers each processing different features, enhanced ML and AI frameworks may be provided that are faster, lighter on computing resources and processing, and more accurate for changing data. This allows a service provider to better assess an entity and provide computing services to that entity.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a computing device 110 and a service provider server 120 in communication over a network 140. Computing device 110 may be utilized by a user or other entity with computing services that perform predictive analysis, recommendations, and other predictive outputs based on user inputs and requests. Service provider server 120 may provide various data, operations, and other functions to the user, including providing a multi-layer ML or other AI model framework that connects multiple different ML or AI models for intelligent and predictive decision-making. In this regard, service provider server 120 may utilize this multi-layer framework in order to provide predictive output at different times over a time period in order to output decisions, predictions, or scores that may be used when providing the computing services of service provider server 120.

Computing device 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Computing device 110 may be implemented using any appropriate hardware and software configured for wired and/or wireless communication with service provider server 120 for processing payments and transactions, or utilizing other computing services, of service provider server 120. Use of these computing services may utilize one or more ML or AI frameworks having multiple layers for different models trained for static and/or dynamic features from data. Computing device 110 may correspond to an individual user, consumer, or merchant that utilizes a peer-to-peer payment network and platform provided by service provider server 120 to process those transactions. In various embodiments, computing device 110 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing devices may function similarly.

Computing device 110 of FIG. 1 contains an application 112, a database 116, and a network interface component 118. Application 112 may correspond to executable processes, procedures, and/or applications with associated hardware. In other embodiments, computing device 110 may include additional or different software as required.

Application 112 may correspond to one or more processes to execute modules and associated devices of computing device 110 to provide a convenient interface to permit a user of computing device 110 to enter, view, and/or process transactions and/or utilize other computing services of service provider server 120. In this regard, application 112 may correspond to specialized hardware and/or software utilized by computing device 110 that may provide transaction processing or other computing services, including use of multi-layer ML model frameworks to provide predictive outputs and intelligent decision-making during pipeline data processing and management. Use of a progressive decision-making pipeline that utilizes the multi-layer ML model framework may be performed through providing pipeline data 114. Pipeline data 114 may correspond to one or more data sets and/or inputs or information from which ML model features (e.g., both static and dynamic) may be extracted. In this regard, pipeline data 114 may initially correspond to initial input data at a first time where a first decision, prediction, score, or the like may be output by service provider server 120. At a later time, additional data provided for pipeline data 114 may be provided, where one or more second decisions may be determined and/or used to revise the initial decision based on changes in data for the dynamic features provided by service provider server 120.

Input of pipeline data 114 and/or other data for electronic transaction processing or other use of computing services of service provider server 120 may be done through a user interface enabling the user to enter and/or view a transaction, transfer, loan request, outstanding loan, or other data for pipeline data 114. This may be based on a transaction generated by application 112 using a merchant website or merchant application. For example, application 112 may utilize an amount of currency to provide payments or transfers to recipients. Additionally, application 112 may utilize a digital wallet associated with transaction processing based on pipeline data 114. Application 112 may also be used to receive a receipt or other information based on transaction processing. In various embodiments, application 112 may correspond to a general browser application configured to retrieve, present, and communicate information over the Internet (e.g., utilize resources on the World Wide Web) or a private network. For example, application 112 may provide a web browser, which may send and receive information over network 140, including retrieving website information, presenting the website information to the user, and/or communicating information to the website, including payment information for the transaction. However, in other embodiments, application 112 may include a dedicated application of service provider server 120 or other entity (e.g., a merchant), which may be configured to assist in processing transactions, such as a mobile application on a mobile device.

Computing device 110 may further include database 116 which may include, for example, identifiers such as operating system registry entries, cookies associated with application 112 and/or other applications, identifiers associated with hardware of computing device 110, or other appropriate identifiers. Identifiers in database 116 may be used by a payment/service provider to associate computing device 110 with a particular account maintained by the payment/service provider. Database 116 may also further store received transaction data and/or data for processing by service provider server 120, such as pipeline data 114 and/or other data where features for ML model processing may be extracted.

Computing device 110 includes at least one network interface component 118 adapted to communicate with service provider server 120 and/or other devices or servers over network 140. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may provide operations for ML and/or other AI models built for one or more multi-layer ML model frameworks for progressive decision-making in a decision-making pipeline (e.g., for multiple decisions over a time period). In this regard, service provider server 120 includes one or more processing applications which may be configured to interact with computing device 110 when utilizing ML models for the multi-layer ML model framework(s). In one example, service provider server 120 may be provided by PAYPAL®, Inc. of San Jose, CA, USA. However, in other embodiments, service provider server 120 may be maintained by or include another type of service provider.

Service provider server 120 of FIG. 1 includes a pipeline management application 130, a transaction processing application 122, a database 124, and a network interface component 128. Pipeline management application 130 and transaction processing application 122 may correspond to executable processes, procedures, and/or applications with associated hardware. In other embodiments, service provider server 120 may include additional or different modules having specialized hardware and/or software as required.

Pipeline management application 130 may correspond to one or more processes to execute modules and associated specialized hardware of service provider server 120 to provide one or more data processing and/or management of data over a time period for progressive decision-making. In this regard, pipeline management application 130 may correspond to specialized hardware and/or software used by service provider server 120 to implement an AI pipeline framework 132 that determines and/or outputs predictive decisions, scores, and the like in order to provide computing services and other computing operations by service provider server 120 to an entity associated with computing device 110. In some embodiments, the computing services may be associated with transaction processing application 122, such as when providing different transaction processing and/or financial services to users. AI models 134 for AI pipeline framework 132 may be trained using training data, which may have features or variables determined for AI models 134 from extracted and processed data for different layers of AI models 134. In some embodiments, AI models 134 may correspond to ML or NN models trained having an input layer, one or more hidden layers, and an output layer that provides a classification, score, or other predictive output based on input to the input layer.

For example, in order to generate AI models 134, AI pipeline framework 132 may detect, record, log, and store training data. Thereafter, AI models 134 may be trained using the training data, which may include different features and/or variables that process input data associated with the features and/or variables and provides a corresponding predictive output. Each of AI models 134 may include different features which may or may not overlap. In this regard, with multiple layers of AI, ML, or NN model processing, an output by one of AI models 134 may be used as an input to another one of AI models 134 (e.g., as an input feature with corresponding weight) that further processes additional features to provide another output. The second output may be the predictive output and decision or score by AI pipeline framework but may also or instead be used as an input feature to another layer. As many different layers may be used as desirable, such as based on static, dynamic, super dynamic, or other labeled feature or variable, and the estimated likelihood and/or amount of time that corresponding data may change and be required to be reprocessed and the predictive output updated, adjusted, and/or changed.

Once trained, AI models 134 may be deployed. Incoming pipeline data 136 may then be received and data for the feature for each model may be extracted. For example, a first ML or other AI model of AI models 134 may process static features not expected to change over a time period. The data for those static features may therefore be extracted and used as the input to this first static feature model. Thereafter, a static feature predictive output of predictive outputs 138 may be provided, which may be used as an input feature to a second ML or other AI model of AI models 134. This model may further process dynamic features and therefore extracted data for those dynamic features may be further provided as input to this model. The second dynamic feature model may then provide another one of predictive outputs 138, which may correspond to the resulting output used to provide a service to an entity. However, further ML or other AI models and layers may also be used for additional features, if desired. The predictive output resulting from a previous ML or other AI model layer (e.g., the static feature predictive output from the first static feature model) may be stored so that the corresponding model does not need to be rerun and those features reprocessed, which wastes computing resources. Instead, on the model layers for which data has or is expected to potentially change during the time period are required to be re-executed using additional data for which features for those model layers has been extracted. Thereafter, predictive outputs 138 may be used with one or more computing services, resources, or applications of service provider server 120, such as transaction processing application 122, to provide intelligent decision-making and/or predictive services to entities and/or service provider server 120.

Transaction processing application 122 may correspond to one or more processes to execute modules and associated specialized hardware of service provider server 120 to process a transaction, which may be used to process payments and other services to one or more users or other entities using pipeline management application 130. In this regard, transaction processing application 122 may correspond to specialized hardware and/or software used by a user to establish a payment account and/or digital wallet, which may be used to generate and provide user data for the user, as well as process transactions. In various embodiments, financial information may be stored to the account, such as account/card numbers and information. A digital token for the account/wallet may be used to send and process payments, for example, through an interface provided by service provider server 120. In some embodiments, the financial information may also be used to establish a payment account and provide payments through the payment account. The payment account may be accessed and/or used through a browser application and/or dedicated payment application, which may include AI functionalities including multi-layer ML model frameworks that process input data to provide different decisions, predictions, and/or scores at different times over a time period. Transaction processing application 122 may process the payment and may provide a transaction history for transaction authorization, approval, or denial.

Additionally, service provider server 120 includes database 124. Database 124 may store various identifiers associated with different devices, servers, data, and the like. Database 124 may also store account data, including payment instruments and authentication credentials, as well as transaction processing histories and data for processed transactions. Database 124 may store financial information and tokenization data, as well as transactions, transaction results, and other data generated and stored by transaction processing application 122. Additionally, data processed by pipeline management application 130 may be stored by database 124, such as historical data 126 that may be used for training data and/or for extraction of data for static and/or dynamic features of AI models 134.

In various embodiments, service provider server 120 includes at least one network interface component 128 adapted to communicate with computing device 110 and/or other devices and/or servers over network 140. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

Figure 2A:
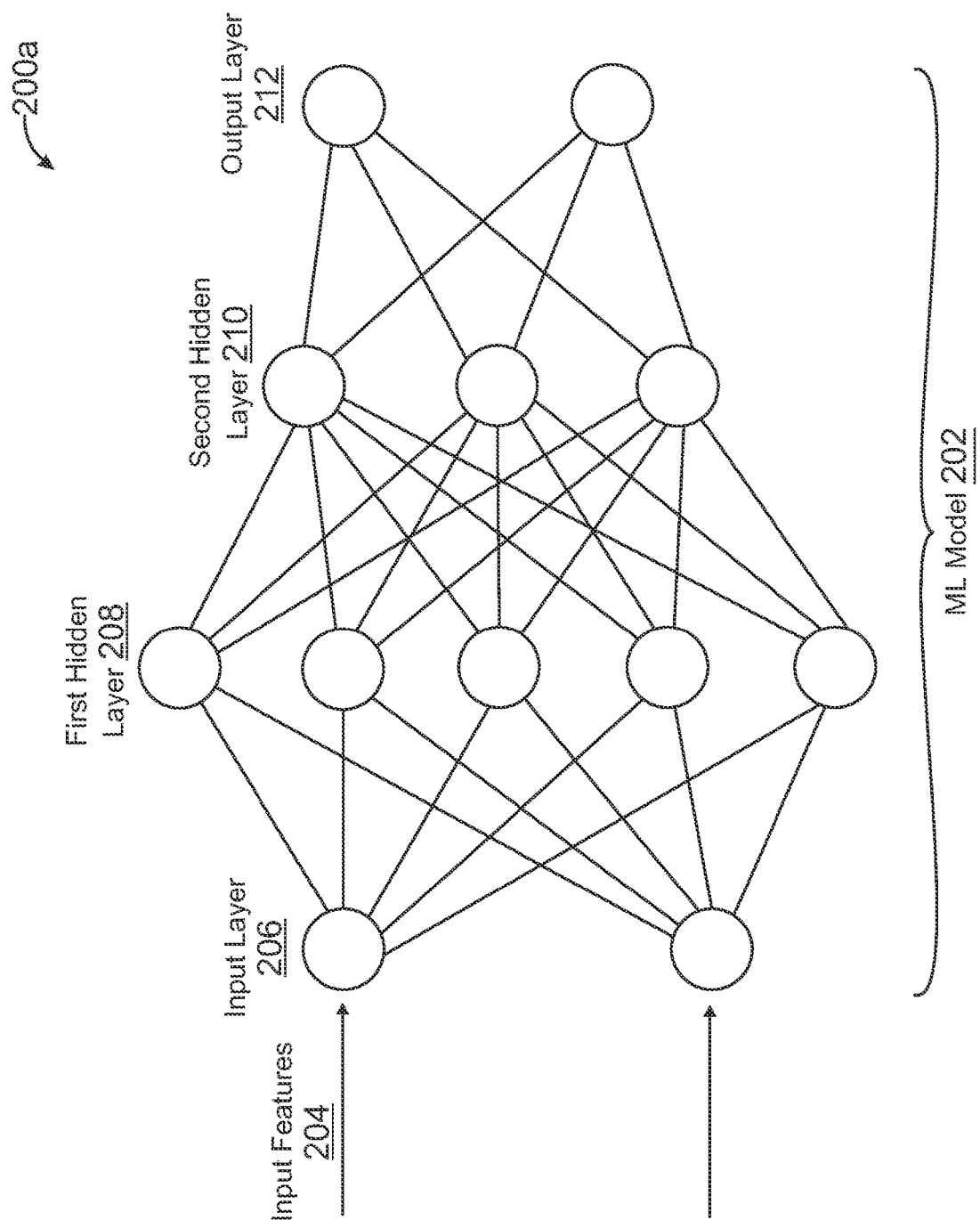
FIG. 2A is an exemplary diagram of different layers trained for an ML model trained for a multi-layer ML framework, according to an embodiment.

FIG. 2A is an exemplary diagram 200a of different layers trained for an ML model trained for a multi-layer ML framework, according to an embodiment. An ML model 202 and trained layers in diagram 200a may be used as a part or layer of a multi-layer ML model or other AI model framework where progressive decision-making may be made on pipeline data that changes in certain aspects or parameters over a time period. For example, ML model 202 may be used as part of pipeline management application 130 when outputting pipeline decisions and/or outputs using AI models 134 of AI pipeline framework 132.

ML model 202 may be generated based on training data associated with input features and output classifications, decisions, predictions, or scores, which may be labeled and/or unlabeled for annotated or unannotated data, respectively. When building ML model 202, the training data may be used to generate one or more classifiers and provide recommendation, predictions, or other outputs based on those classifications and an ML model algorithm and/or trained. For example, ML model 202 may include one or more layers, including an input layer 206, one or more hidden layers including a first hidden layer 208 and a second hidden layer 210, and an output layer 212, where each have one or more nodes. However, different, more, or less layers may also be utilized. For example, as many hidden layers as necessary or appropriate may be utilized. Each node within a layer is connected to a node within an adjacent layer, where a set of input values (e.g., input features 204 where those features may correspond to training data) may be used to generate one or more output values or classifications in output layer 212. Within the input layer, each node may correspond to a distinct attribute or input data type that is used to train ML model 202.

Thereafter, first hidden layer 208 and second hidden layer 210 may be trained with these attributes and corresponding weights using an ML algorithm, computation, and/or technique. For example, each of the nodes in first hidden layer 208 and second hidden layer 210 generates a representation, which may include a mathematical ML computation (or algorithm) that produces a value based on the input values of the input nodes in input layer 206. The ML algorithm may assign different weights to each of the data values received from the input nodes. The hidden layer nodes in first hidden layer 208 and second hidden layer 210 may include different algorithms and/or different weights assigned to the input data and may therefore produce a different value based on the input values. The values generated by the hidden layer nodes may be used by output layer 212's node(s) to produce one or more output values for ML model 202 that attempt to provide intelligent decision-making and predictive outputs from input features 204. Thus, when ML model 202 is used to perform a predictive analysis and output, the input may provide a corresponding output based on the classifications trained for ML model 202.

ML model 202 may be trained by using training data corresponding to the desired predictive outputs and decision-making for the progressive decision-making pipeline. By providing training data to train ML model 202, the nodes in first hidden layer 208 and second hidden layer 210 may be trained (adjusted) such that an optimal output (e.g., a classification) is produced in output layer 212 based on the training data. By continuously providing different sets of training data and penalizing ML model 202 when the output of ML model 202 are incorrect or exceed an accuracy threshold, ML model 202 (and specifically, the representations of the nodes in the hidden layer(s)) may be trained (adjusted) to improve its performance in data classification. Adjusting ML model 202 may include adjusting the weights associated with each node in the hidden layer. Further, ML model 202 may be trained by retrofitting one or more models based on the currently trained model(s), inputs, and classifications. Although ML models are discussed with reference to diagram 200a, the models may also be rule-based AI models (e.g., having rules that may be executed to determine decisions or outputs based on static and/or dynamic data features) and/or NN models (e.g., using densely trained neural features and layers).

Once ML model 202 have been generated, pipeline management application 130 may provide functionalities associated with computing services using ML model 202. For example, ML model 202 may be used in a multi-layer ML model framework that employs multiple decision-making layers for different ML models that provide a predictive output used in pipeline decision-making that changes or is adjusted over a time period. In some embodiments, the service associated with the multi-layer ML model framework may be associated with one of a financial asset, a financial loan, or a financial benefit. These financial services may be more particularly associated with progressive decision-making for a delinquency status, a delinquency remittance likelihood, a credit worthiness, a loan worthiness, a likelihood of loan acceptance, an advertising campaign, a variable entity risk analysis, a recommendation, or an online search result preference. Other services may include performing a risk analysis, operating a computing device, providing a marketplace recommendation, providing a search result, operating a vehicle or autonomous device, or other AI predictive outputs.

Input features 204 may include static features where ML model 202 is used to provide an output to static features extracted from feature and/or entity data. However, where ML model 202 is used to process dynamic features with an output from another ML model that processes those static features, input features 204 may also include that static feature output with the dynamic features that may be reprocessed and further analyzed for a predictive output at different times over a time period. Thus, data for static features may be processed by a static feature ML model as a layer of the framework once during the time period at a first time when a first output is provided and may be saved and stored as an input feature later for a dynamic feature ML model as another layer of the framework. Static features may include personal information, financial information, business entity information, long-term asset information, or long-term debt information. At the first time, the dynamic feature ML model may also be executed with data for dynamic features to provide an output.

At one or more second, later, times during the time period, data for the dynamic features may be considered to be changed and therefore the dynamic feature's data may be processed at least twice over the time period. Dynamic features may include a variable account balance, short-term asset information, short-term debt information, an amount of time between different dynamic feature processing, or an activity engaged in by an entity during or over the time period. Thus, extracted dynamic feature data may be used as input in input layer 206 with the previous static feature ML model output for another predictive output in output layer 212 at the one or more second times. This allows for changing, adjusting, and/or updating predictive outputs without being required to entirely run an ML model and/or framework and reprocess all static features, which unnecessarily wastes time and computing resources.

Figure 2B:
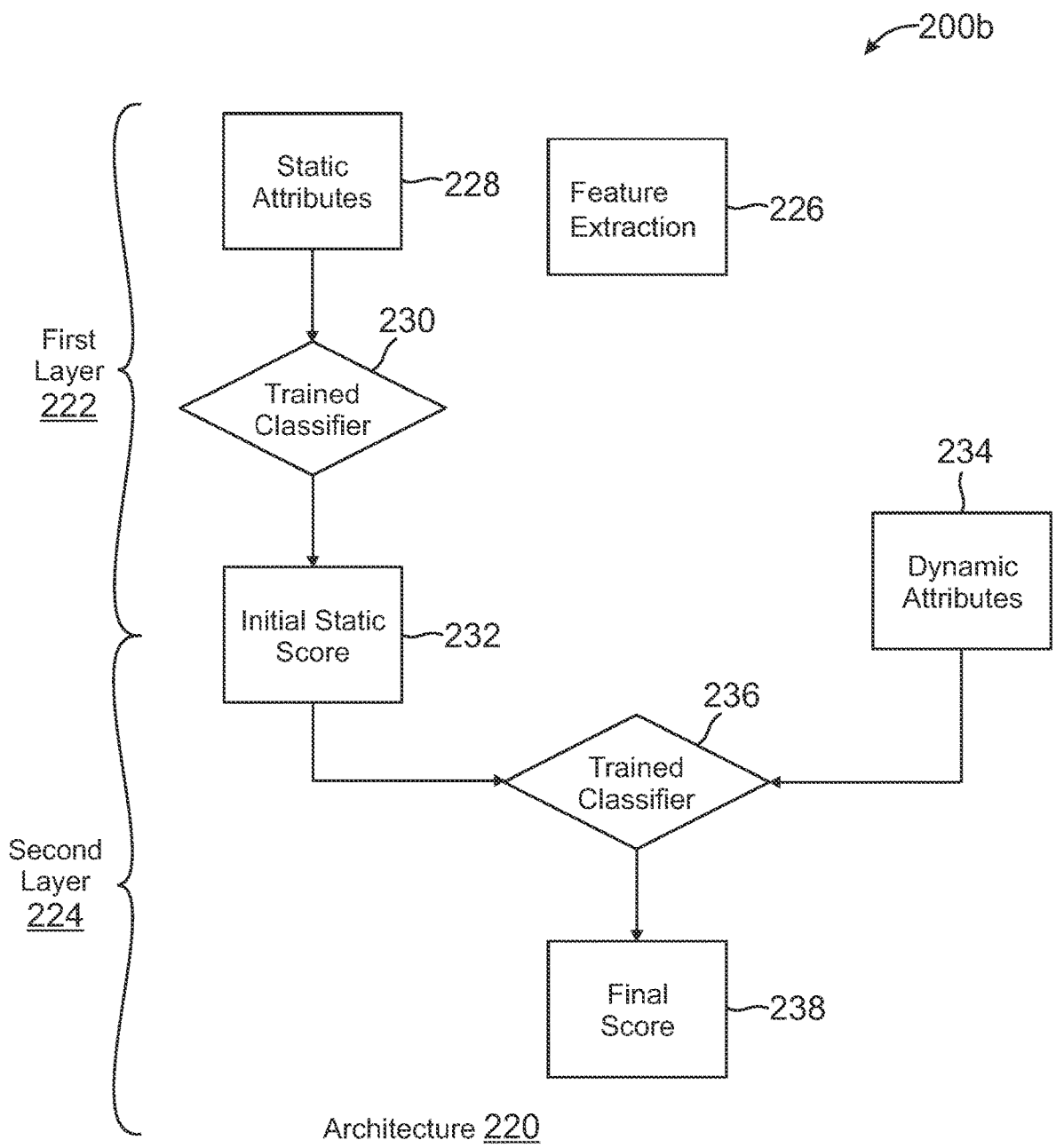
FIG. 2B is an exemplary diagram of a multi-layer ML framework for pipeline decision-making, according to an embodiment.

FIG. 2B is an exemplary diagram 200b of a multi-layer ML framework for pipeline decision-making, according to an embodiment. Diagram 200b of FIG. 2B includes operations performed via an architecture 220 for a multi-layer ML model framework having a first layer 222 and a second layer 224 that may be executed when providing pipeline decision-making by pipeline management application 130 discussed in reference to system 100 of FIG. 1. In this regard, diagram 200b includes the operations and components of pipeline management application 130 for executing AI pipeline framework 132 for service provider server 120 from system 100.

In this regard, first layer 222 may be used to process first layer features, attributes, and/or variables from incoming pipeline data for the decision-making pipeline of pipeline management application 130. This may be performed at a first time, such as when an initial decision, score, or other predictive output is required and requested. However, with pipeline data for decision-making pipelines, portions of the data may change over the time period designated for the pipeline of decisions on providing a computing service, resource, or the like to an entity. For example, data for certain features, attributes, and/or variables for the output decision may change during the time period. This may occur due to new or updated data, engaged in activities by the entity, received and/or sent items, assets, and the like, and other over time tasks and operations that accrue or determine new data for the entity. Thus, architecture 220 for the multi-layer ML model framework employs first layer 222 with second layer 224 each having different features, which may or may not overlap, that are processed at an initial time and potentially one or more later times during the time period to provide a predictive output.

For example, for first layer 222 and second layer 224, a feature extraction 226 may be performed to determine static attributes 228 and dynamic attributes 234, which may be processed by a ML or other AI model in first layer 222 and second layer 224, respectively. In first layer 222, static attributes 228 may be those features, variables, and/or attributes for which data is considered to remain static and/or not change during the time period over which predictive outputs are determined, changed, and/or adjusted over the time period by the decision-making pipeline. Although data for static features and attributes may change over the time period, static attributes 228 may not be reprocessed and the data updated for additional predictive outputs. Thus, static attributes 228 may be processed in first layer 222 once (or a limited number of times, if desirable) by trained classifier 230 during the time period for determination of initial static score 232. Initial static score 232 may then be stored and/or used by second layer 224 for an overall predictive output or score provided by architecture 220 for the multi-layer ML model framework.

Trained classifier 230 may correspond to a first layer ML model for static features, such as one discussed in reference to diagram 200a of FIG. 2A. For first layer 222, trained classifier 230 may correspond to a trained ML model using binary classification algorithms, such as Gradient Boosting Machine (GBM). Using the ML model, initial static score 232 may correspond to an initial output from the ML model based on extracted data for static attributes 228. Thus, output of first layer 22 may be consumed by second layer 224, such as in a column of a data table that further includes columns for values or other data for dynamic features. An overall output from architecture 220 for the multi-layer ML model framework may also require analysis of dynamic attributes 234, which may be considered as those features or attributes that change over the time period. Dynamic attributes 234 may be processed and/or reprocessed at one or more times over the time period in order to provide an output used by the progressive decision-making pipeline to provide a computing service, resource, or the like to an entity. Second layer 224 may therefore take, as input data for features of trained classifier 236, initial static score 232 with dynamic attributes 234 for processing by trained classifier 236. Similar to trained classifier 230, trained classifier 236 may correspond to a second layer ML model for a static feature output or score of initial static score with dynamic attributes 234. For second layer 224, trained classifier 236 may correspond to a trained ML model using linear regression or the like.

Trained classifier 236 may then be used to output final scores 238, which may be used by the progressive decision-making pipeline to make a decision, prediction, or the like with an entity. Such decisions may be used when the entity interacts with and/or requests services from the corresponding service provider (e.g., service provider server 120), or may be used to provide recommendations to other users, service providers, and/or entities. Final scores 238 may be calculated at an initial point in time by running data for static attributes 228 and dynamic attributes 234 from feature extraction 226 through first layer 222 and second layer 224 when executing architecture 220 for the multi-layer ML model framework. However, at one or more later times, initial static score 232 may be stored and accessed with additional dynamic features or attributes from additional data and further data extractions for dynamic attributes 234. Thereafter, second layer 224 may be used to update, determine a new score or output, and/or adjust a previous score or output without being required to reprocess data for static attributes 228. Thus, a lighter solution that requires less processing resources and power and more optimized feature data storage may be provided through architecture 220 for the multi-layer ML model framework.

Figure 3A:
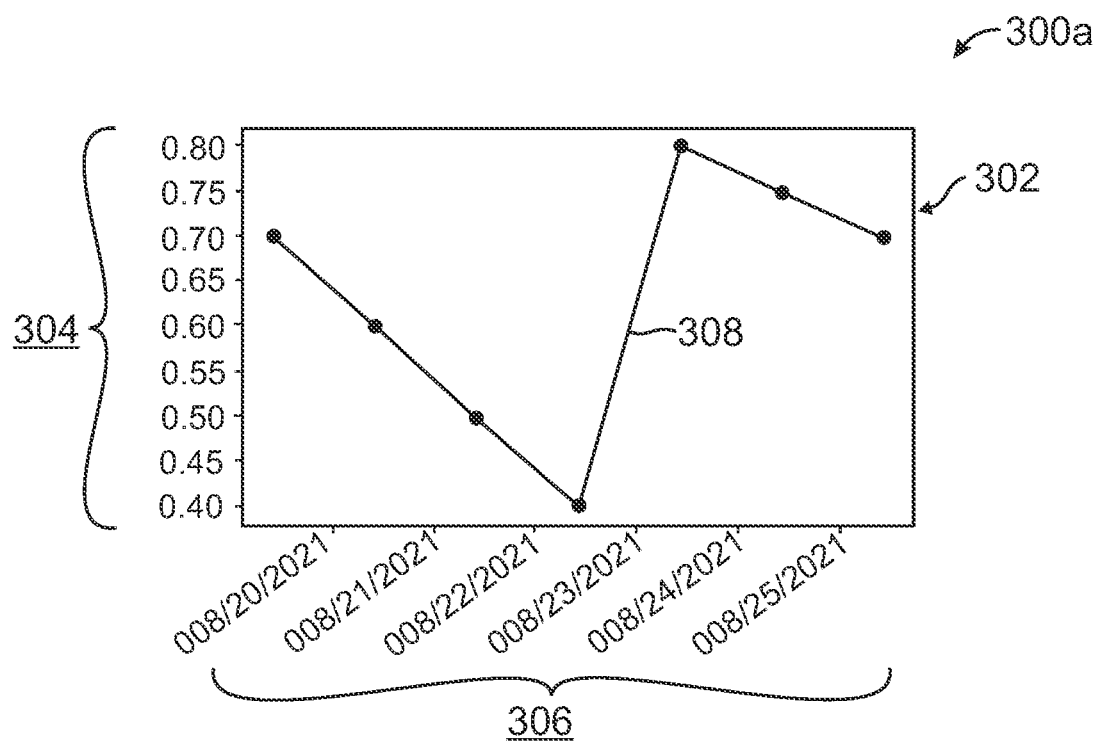
FIG. 3A is an exemplary graph of decision-making outputs by a decision-making pipeline that change over a time period from changing dynamic features, according to an embodiment.

FIG. 3A is an exemplary diagram 300a of graph decision-making outputs by a decision-making pipeline that change over a time period from changing dynamic features, according to an embodiment. Diagram 300a shows a graph 302 for changing scores or other outputs by the ML model operations and components implemented and executed by pipeline management application 130 of service provider server 120 discussed in reference to system 100 of FIG. 1. In this regard, pipeline management application 130 may operate to provide changing predictive scoring of an entity (e.g., for loan delinquency, a sales pipeline for sales predictions or likelihood, likelihood of loan acceptance or success, etc.), where diagram graph 302 shows a trajectory of those scores over a time period from predictive scores generated at different times using a multi-layer ML or other AI model framework.

In graph 302 of diagram 300a, the y-axis shows scores 304, which can be other values, as an output of the multi-layer ML model framework after processing and scoring data for static and dynamic features, attributes, or variables in two or more layers each having a corresponding ML model. The x-axis shows dates 306 for a time period or a portion of a time period over which data for the dynamic features, attributes, or variables may change and therefore cause a corresponding change in scores 304 on each of dates 306. A line graph 308 shows the trajectory or over-time changes of scores 304 on dates 306 for graph 302. The changes to scores 304 on dates 306 may be caused by changes to data for the dynamic features. For example, an available account balance of a user's account may change daily and thus, data for an available account balance feature may change and be reprocessed on each of dates 306. This causes a corresponding change in the output of the multi-layer ML model framework for scores 304.

For example, static features may have data that does not change and/or is not reprocessed on each of dates 306. Instead, a static feature score is calculated at an initial time for the input data for the multi-layer ML model framework and may be stored and/or accessed to be used on each of dates 306 when calculating scores 304 by the multi-layer ML model framework. Thus, as the dynamic features data changes, scores 304 on dates 306 may change when determined by the multi-layer ML model framework. This may include executing the multiple layers of the multi-layer ML model framework each having a corresponding ML model to process static and/or dynamic features. With the dynamic feature layer and corresponding ML model, only that layer and model may be required to be reprocessed at later one of dates 306 to determine scores 304.

Thus, scores 304 show a range of changing scores based on changes to dynamic features. The range of changes of scores 304 may be limited as the data for the static features remains the same and is not reprocessed on each of dates 306. Thus, the input static feature score from the static feature ML model and corresponding layer may be provided as input (with a corresponding weight) for the dynamic feature ML model and corresponding layer. This may cause the static feature score and therefore output scores to remain the same when processed by the dynamic feature ML model and corresponding layer while dynamic features data changes as input to that dynamic feature ML model. Line graph 308 may show the trajectory of changes. For example, over time, the predictive score may decrease due to one or more dynamic features, such as time since initial scoring by the multi-layer ML model framework and/or more unfavorable data. However, on one of dates 306, additional favorable data (e.g., a response by a user, an increase in an entity's assets, etc.) may be received, which may cause a corresponding one of scores 304 to increase, shown as the jump in line graph 308. These changes may be caused by different input data for the dynamic features processed by the dynamic feature ML model and corresponding layer with the static feature score.

Figure 3B:
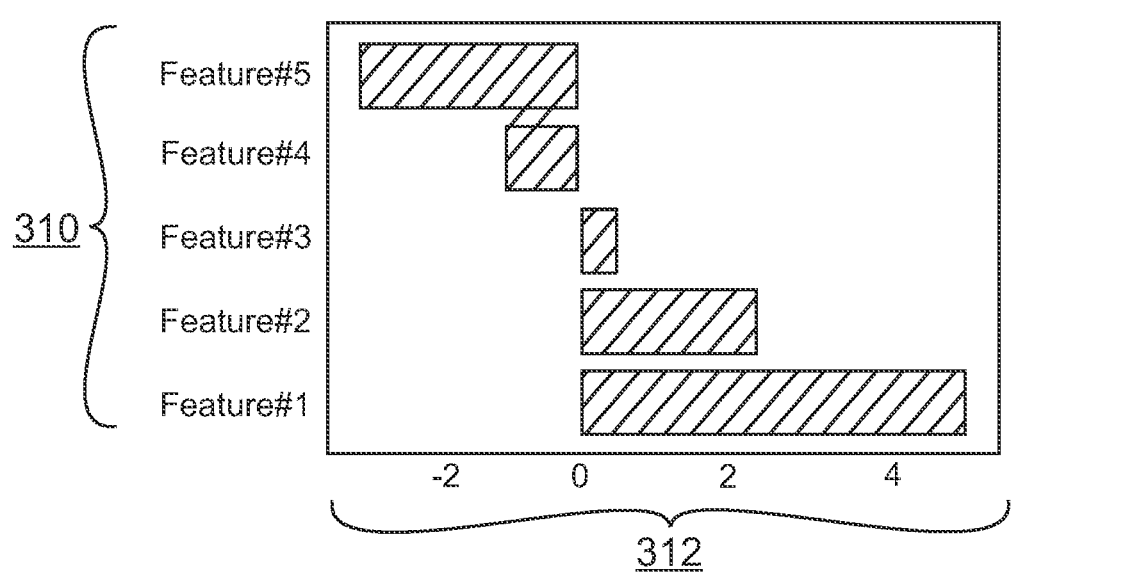
FIG. 3B are exemplary coefficients of feature importance that may change based on differences for changing data in a decision-making pipeline, according to an embodiment.

FIG. 3B are exemplary coefficients 300b of feature importance that may change based on differences for changing data in a decision-making pipeline, according to an embodiment. Coefficients 300b include features 310 having values 312 that may be applied as coefficients when determining an output of a second (or further) layer of a multi-layer ML model framework that processing static features in an ML model layer and dynamic features in one or more ML model layers. In this regard, coefficients 300b may be used by pipeline management application 130 of service provider server 120 discussed in reference to system 100 of FIG. 1 for predictive analysis, scoring, and the like of data.

In FIG. 3B, coefficients 300b may be used with a second layer to provide different value coefficients when processing a logistic regression ML model for scoring of a static score output from a static ML model layer with data for dynamic features. For the dynamic ML model layer, output of this second layer may correspond to a propensity score that is run and determined on a particular day (or other time, such as hourly, weekly, monthly, etc.). For the second ML model classifier, logistic regression may be chosen to understand feature contributions both qualitatively and quantitatively to the overall output score. For example, features 310 having negative values for coefficients may represent negative contributions to the output score, while features with a positive contribution, and those larger in magnitude, may represent a positive and larger magnitude contribution to a score. a longer duration signals a lower propensity score. Those values 312 may be used to adjust the overall affect of the static score output from the static ML model layer with data for dynamic features that is processed by the dynamic ML model layer.

Figure 4:
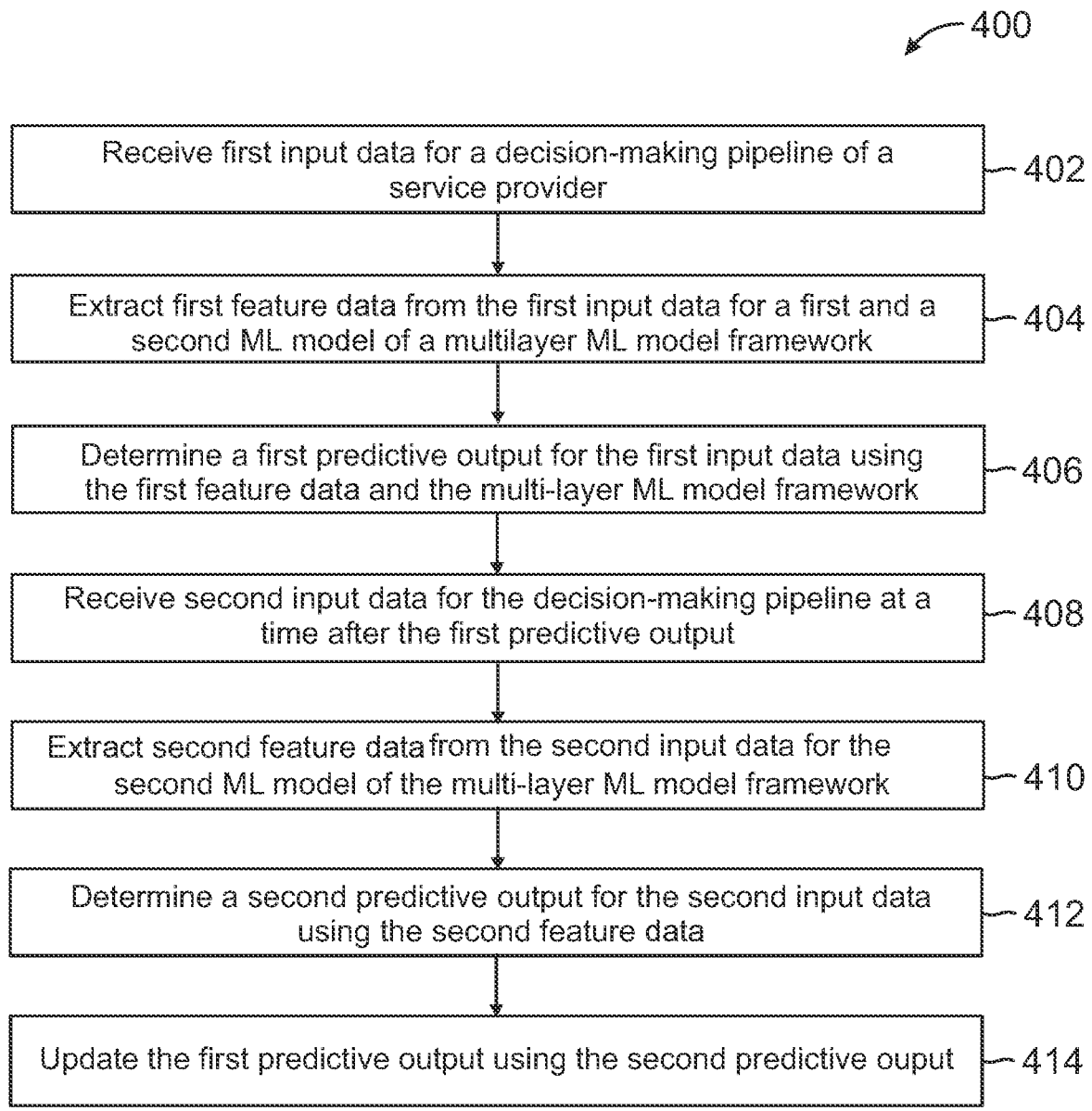
FIG. 4 is a flowchart for multi-layer ML models for progressive predictions during data pipeline management, according to an embodiment.

FIG. 4 is a flowchart 400 for multi-layer ML models for progressive predictions during data pipeline management, according to an embodiment. Note that one or more steps, processes, and methods described herein of flowchart 400 may be omitted, performed in a different sequence, or combined as desired or appropriate.

At step 402 of flowchart 400, first input data for a decision-making pipeline of a service provider is received. The first input data may be received at a first time for a time period where decisions, scores, and other outputs may be provided by the decision-making pipeline in order to provide a product, service, resource, or the like to an entity associated with the first input data. These outputs may change, and therefore the product, service, resource, or the like may vary in whether provided and the provided level, amount, terms, or value may also be adjusted over the time period based on the varying outputs.

At step 404, first feature data from the first input data for a first and a second ML model of a multi-layer ML model framework may be extracted. The extracted data may correspond to static features for the first ML model processed in a first layer of the multi-layer ML model framework. The extracted data may further correspond to dynamic features for the second ML model processed in a second layer of the multi-layer ML model framework. The second layer may correspond to another layer that utilizes the output of the first layer and input that is consumed by the second layer. Thus, the first ML model in the first layer may only need to be executed to process static feature data once (or a smaller number of times) so that a static feature score or output may be stored and later used again by the second ML model in the second layer. This allows processing of changing data for the dynamic features to only require execution of the second layer using the static feature output with changing dynamic feature data, which requires less feature processing and data processing resources.

At step 406, a first predictive output for the first input data is determined using the first feature data and the multi-layer ML model framework. This predictive output may correspond to a score or other decision, recommendation, or prediction that may be used by the decision-making pipeline. The output may be determined at a first time for a time period. Thereafter, at step 408, second input data for the decision-making pipeline is received at a time after the first predictive output. The second input data may be received at a second time after the first time and/or determination of the first predictive output. This may include data that changes for the dynamic features that are processed by the second ML model in the second layer.

At step 410, second feature data is extracted from the second input data for the second ML model of the multi-layer ML model framework. The second feature data may correspond to the data necessary for the dynamic features of the second ML model and may not require extraction and/or analysis of data for static features by the first ML model. Thus, the multi-layer ML model framework may only be required to process the second ML model with the second feature data, which utilizes the stored static feature output from the first ML model as a feature input for an input layer of the second ML model.

At step 412, a second predictive output for the second input data is determined using the second feature data. The second predictive output may be determined in order to adjust, replace, or change the first predictive output based on changes to data over the time period, such as between the aforementioned first time and the second time. This allows decision-making and score/outputs of the multi-layer ML model framework for the progressive decision-making pipeline to be updated and more current over the time period, thereby avoiding issues with expired or old data for an entity. At step 414, the first predictive output is updated using the second predictive output. Updating may include changing or replacing the first with the second predictive output in order to provide more recent scoring or evaluation of an entity for the decision-making pipeline. In further embodiments, the first output may be adjusted with the second output, such as by weighting each in an overall score or output and/or otherwise mathematically adjusting each output based on over time changes.

Figure 5:
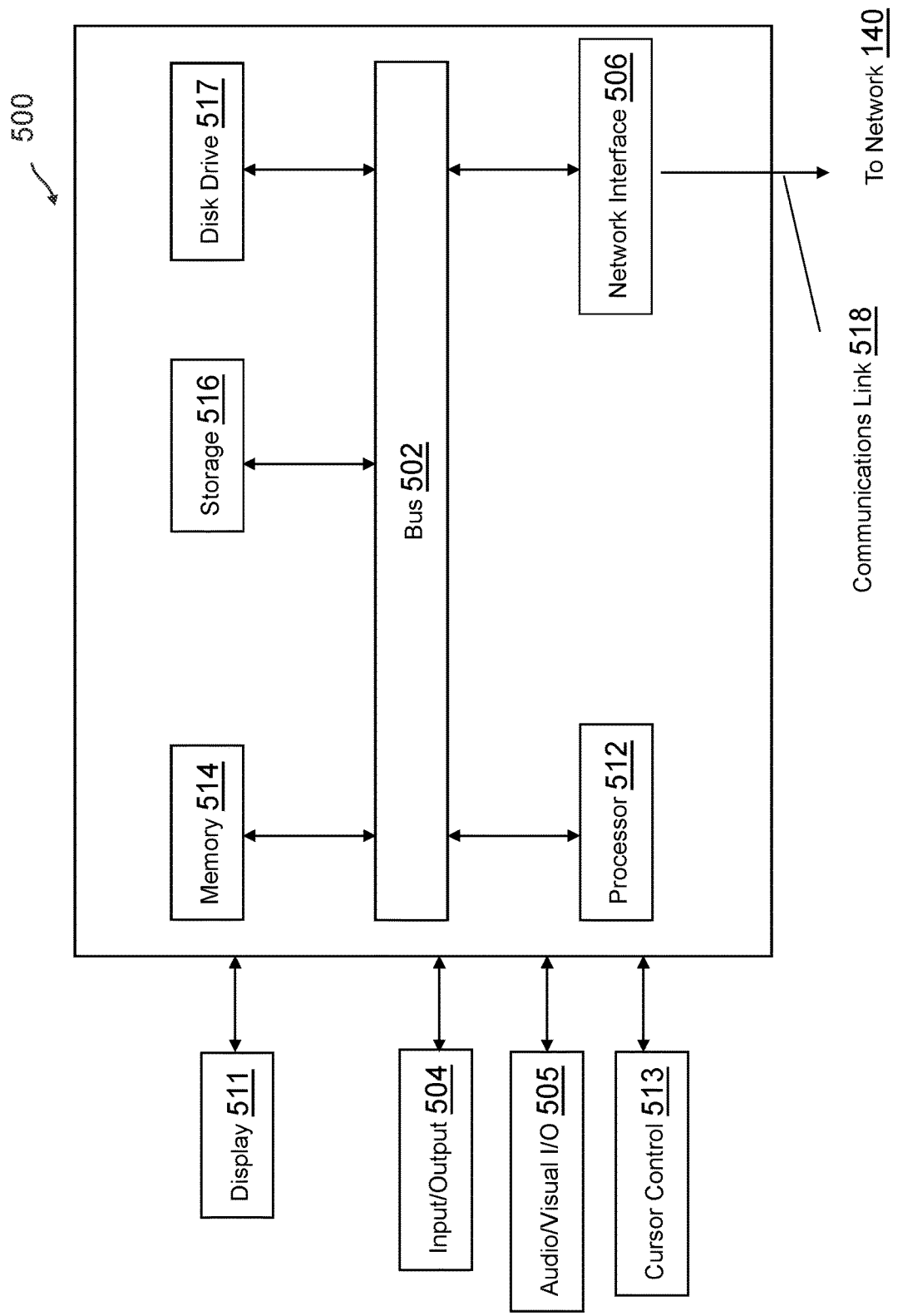
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method of using a multi-layer predictive machine learning (ML) engine, comprising;
   receiving, at a feature extraction module of the multi-layer predictive ML engine, a first set of data associated with an entity and usable as an input to the multi-layer predictive ML engine for time-based predictions at different times over a time period, and wherein the first set of data is associated with a first time during the time period;
   segmenting, by the feature extraction module, the first set of data in accordance with a first set of ML features and a second set of ML features, wherein the first set of ML features remain unchanged over the time period and the second set of ML features dynamically change over the time period;
   generating, by a first classifier of the multi-layer predictive ML engine trained on static feature data and connected to the feature extraction module, based on the segmented first set of data for the first set of ML features, a first ML model output indicating a static feature score associated with the first time;
   generating, by a second classifier of the multi-layer predictive ML engine trained on dynamic feature data and connected to both the first classifier and the feature extraction module, based on the segmented first set of data for the second set of ML features, the first ML model output, a first time-based prediction indicating a first final feature score associated with the first time;
   receiving a second set of data for the predictive ML engine associated with a second time after the first time during the time period;
   segmenting, by the feature extraction module, the second set of data in accordance with the first set of ML features and the second set of ML features;
   using the first ML model output as an input to the second classifier of the multi-layer predictive ML engine; and
   generating, by the second classifier of the multi-layer predictive ML engine, based on the segmented second set of data for the second set of ML features, the first ML model output, a second time-based prediction indicating a second final feature score for the second time.

2. The method of claim 1, further comprising:
performing one of an adjustment of the first time-based prediction to the second time-based prediction or an update of the first time-based prediction based on the second time-based prediction.

3. The method of claim 2, wherein the first and second time-based predictions are associated with a decision for a service provided to the entity, and wherein the method further comprises:
determining, at the second time, whether to change the decision for the service made available to the entity after the first time based on the adjustment or the update.

4. The method of claim 1, further comprising:
providing one of a service, a resource, or information to the entity at the different times during the time period including the first time and the second time based on at least one of the first time-based prediction or the second time-based prediction; and
outputting at least one of the first time-based prediction or the second time-based prediction to the entity at the first time or the second time.

5. The method of claim 1, further comprising:
making a comparison between the first time-based prediction and the second time-based prediction for the second time; and
reporting the comparison to the entity.

6. The method of claim 1, wherein first set of ML features comprise static data features for corresponding data that remains unchanged over the time period, wherein the second set of ML features comprise dynamic data features for corresponding data that varies over the time period, and wherein the static data features are for a first ML model of the multi-layer predictive ML engine and the dynamic data features are for a second ML model of the multi-layer predictive ML engine.

7. The method of claim 6, wherein the multi-layer predictive ML engine comprises a multi-layer ML model framework, and wherein the second ML model is configured to utilize the dynamic data features with one or more features corresponding to outputs by the first ML model as input values for the second time-based prediction.

8. The method of claim 7, wherein prior to the receiving the first set of data, the method further comprises:
training the multi-layer ML model framework based on training data for the first ML model and the second ML model, wherein the training data comprises feature data associated with the static data features and the dynamic data features.

9. A system of a multi-layer predictive machine learning (ML) engine, comprising:
a non-transitory memory storing a plurality of processor-executable instructions for operating the multi-layer predictive ML engine having a feature extraction module, a first classifier trained on static feature data and connected to the feature extraction module, and a second classifier trained on dynamic feature data and connected to both the first classifier and the feature extraction module; and
one or more hardware processors coupled to the non-transitory memory and configured to execute the plurality of processor-executable instructions to cause the system to:
receive a first set of data associated with an entity and usable as an input to the multi-layer predictive ML engine for time-based predictions at different times over a time period, and wherein the first set of data is associated with a first time during the time period;
segment, by the feature extraction module, the first set of data in accordance with a first set of ML features and a second set of ML features, wherein the first set of ML features remain unchanged over the time period and the second set of ML features dynamically change over the time period;
generate, by the first classifier, based on the segmented first set of data for the first set of ML features, a first ML model output indicating a static feature score associated with the first time;
generate, by the second classifier, based on the segmented first set of data for the second set of ML features, the first ML model output, a first time-based prediction indicating a first final feature score associated with the first time;
receive a second set of data for the predictive ML engine associated with a second time after the first time during the time period;
segment, by the feature extraction module, the second set of data in accordance with the first set of ML features and the second set of ML features;
use the first ML model output as an input to the second classifier of the multi-layer predictive ML engine; and
generate, by the second classifier of the multi-layer predictive ML engine, based on the segmented second set of data for the second set of ML features, the first ML model output, a second time-based prediction indicating a second final feature score for the second time.

10. The system of claim 9, wherein executing the plurality of processor-executable instructions further causes the system to:
perform one of an adjustment of the first time-based prediction to the second time-based prediction or an update of the first time-based prediction based on the second time-based prediction.

11. The system of claim 10, wherein the first and second time-based predictions are associated with a decision for a service provided to the entity, and wherein the plurality of processor-executable instructions are further executable to cause the system to:
determine, at the second time, whether to change the decision for the service made available to the entity after the first time based on the adjustment or the update.

12. The system of claim 9, wherein executing the plurality of processor-executable instructions further causes the system to:
provide one of a service, a resource, or information to the entity at the different times during the time period including the first time and the second time based on at least one of the first time-based prediction or the second time-based prediction; and
output at least one of the first time-based prediction or the second time-based prediction to the entity at the first time or the second time.

13. The system of claim 9, wherein executing the plurality of processor-executable instructions further causes the system to:
make a comparison between the first time-based prediction and the second time-based prediction for the second time; and
report the comparison to the entity.

14. The system of claim 9, wherein first set of ML features comprise static data features for corresponding data that remains unchanged over the time period, wherein the second set of ML features comprise dynamic data features for corresponding data that varies over the time period, and wherein the static data features are for a first ML model of the multi-layer predictive ML engine and the dynamic data features are for a second ML model of the multi-layer predictive ML engine.

15. The system of claim 14, wherein the multi-layer predictive ML engine comprises a multi-layer ML model framework, and wherein the second ML model is configured to utilize the dynamic data features with one or more features corresponding to outputs by the first ML model as input values for the second time-based prediction.

16. The system of claim 15, wherein prior to the receiving the first set of data, the plurality of processor-executable instructions are further executable to cause the system to:
   train the multi-layer ML model framework based on training data for the first ML model and the second ML model, wherein the training data comprises feature data associated with the static data features and the dynamic data features.

17. A non-transitory machine-readable medium having stored thereon machine-readable instructions for operating a multi-layer predictive machine learning (ML) engine, executable to cause a machine to perform operations comprising:
   receiving, at a feature extraction module of the multi-layer predictive ML engine, a first set of data associated with an entity and usable as an input to the multi-layer predictive ML engine for time-based predictions at different times over a time period, and wherein the first set of data is associated with a first time during the time period;
   segmenting, by the feature extraction module, the first set of data in accordance with a first set of ML features and a second set of ML features, wherein the first set of ML features remain unchanged over the time period and the second set of ML features dynamically change over the time period;
   generating, by a first classifier of the multi-layer predictive ML engine trained on static feature data and connected to the feature extraction module, based on the segmented first set of data for the first set of ML features, a first ML model output indicating a static feature score associated with the first time;
   generating, by a second classifier of the multi-layer predictive ML engine trained on dynamic feature data and connected to both the first classifier and the feature extraction module, based on the segmented first set of data for the second set of ML features, the first ML model output, a first time-based prediction indicating a first final feature score associated with the first time;
   receiving a second set of data for the predictive ML engine associated with a second time after the first time during the time period;
   segmenting, by the feature extraction module, the second set of data in accordance with the first set of ML features and the second set of ML features;
   using the first ML model output as an input to the second classifier of the multi-layer predictive ML engine; and
   generating, by the second classifier of the multi-layer predictive ML engine, based on the segmented second set of data for the second set of ML features, the first ML model output, a second time-based prediction indicating a second final feature score for the second time.

18. The non-transitory machine-readable medium of claim 17, wherein the operations further comprise:
   performing one of an adjustment of the first time-based prediction to the second time-based prediction or an update of the first time-based prediction based on the second time-based prediction.

19. The non-transitory machine-readable medium of claim 18, wherein the first and second time-based predictions are associated with a decision for a service provided to the entity, and wherein the operations further comprise:
   determining, at the second time, whether to change the decision for the service made available to the entity after the first time based on the adjustment or the update.

20. The non-transitory machine-readable medium of claim 17, wherein the operations further comprise:
   providing one of a service, a resource, or information to the entity at the different times during the time period including the first time and the second time based on at least one of the first time-based prediction or the second time-based prediction; and
   outputting at least one of the first time-based prediction or the second time-based prediction to the entity at the first time or the second time.

* * * * *